United States Patent [19]

Brooks et al.

[11] Patent Number: 4,900,160
[45] Date of Patent: Feb. 13, 1990

[54] POURING SHIELD FOR A FOOD MIXER

[75] Inventors: Timothy L. Brooks, New Carlisle; Brian K. Linstedt, Dayton, both of Ohio

[73] Assignee: Whirlpool Corporation, Benton Harbor, Mich.

[21] Appl. No.: 221,281

[22] Filed: Jul. 19, 1988

[51] Int. Cl.⁴ .................. B01F 15/00; B01F 15/02; B65D 25/42

[52] U.S. Cl. ......................... 366/347; 222/570

[58] Field of Search .................. 366/281–284, 366/347, 150; 220/90.4, 90.6; 222/567, 570; D7/40, 303, 316, 376, 380, 397; D9/373, 449, 434–437, 440, 447, 443–445; 99/DIG. 15

[56] References Cited

U.S. PATENT DOCUMENTS

| | | | |
|---|---|---|---|
| D. 207,051 | 2/1967 | Bainbridge | D9/447 |
| D. 245,672 | 9/1977 | Grantham | D9/447 |
| 947,134 | 1/1910 | Smith | 366/347 |
| 1,020,162 | 3/1912 | Simms | 366/284 |
| 1,768,954 | 7/1930 | Henning | 99/DIG. 15 |
| 2,014,734 | 8/1935 | Hoe | 366/197 |
| 2,504,727 | 4/1950 | Post | 366/347 |
| 2,517,648 | 8/1950 | Franke | 366/347 |
| 2,530,999 | 11/1950 | Schuler | 222/567 |
| 2,766,796 | 10/1956 | Tupper | D7/40 |
| 2,858,118 | 10/1958 | Perkins | 366/347 |
| 3,309,000 | 3/1967 | Haverstier | 222/570 |
| 3,388,829 | 6/1968 | Windman | D9/445 |
| 3,421,654 | 1/1969 | Hexel | D9/435 |
| 3,913,896 | 10/1975 | Hawke | 366/347 |
| 4,314,766 | 2/1982 | Lapeyre et al. | 366/347 |
| 4,370,938 | 3/1988 | Dunn | 366/281 |

OTHER PUBLICATIONS

KitchenAid Special Edition Mixers Brochure.

*Primary Examiner*—Harvey C. Hornsby
*Assistant Examiner*—Joseph S. Machuga
*Attorney, Agent, or Firm*—Jeffers, Hoffman & Niewyk

[57] ABSTRACT

A two-piece combination pouring trough and splash shield for use with a food mixer bowl. The two pieces may be selectively locked together or separated as desired. When locked together, the two pieces form a frusto-conical splash shield. Integrally formed with the splash shield is a pouring trough. A pair of concentric annular ribs are secured to the frusto-conical splash shield whereby the assembled splash shield may rest on the top edge of a bowl and may accommodate various sizes of mixing bowls. The locking mechanism for locking the two pieces of the splash shield together may be configured as a ball and socket arrangement or a tab and slot arrangement.

12 Claims, 3 Drawing Sheets

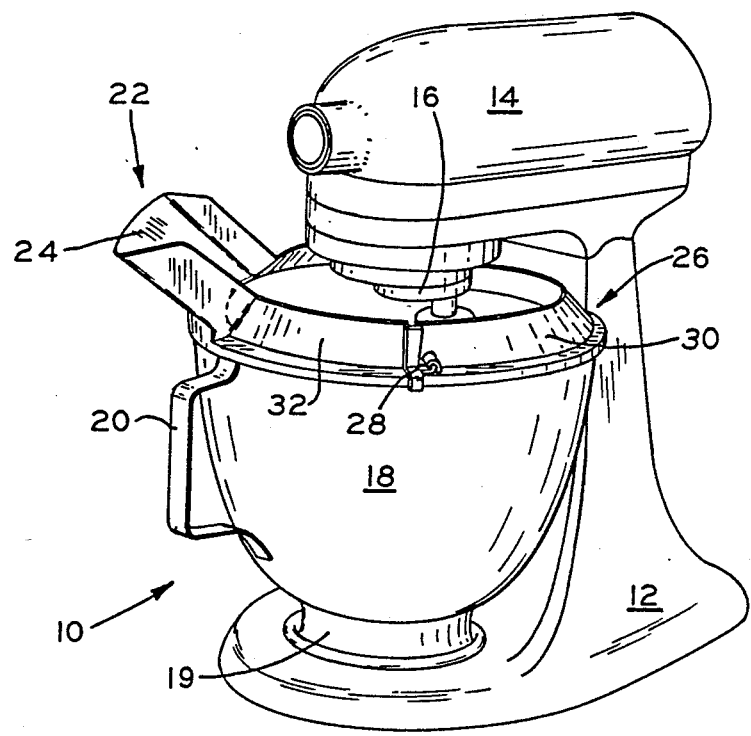
FIG_1
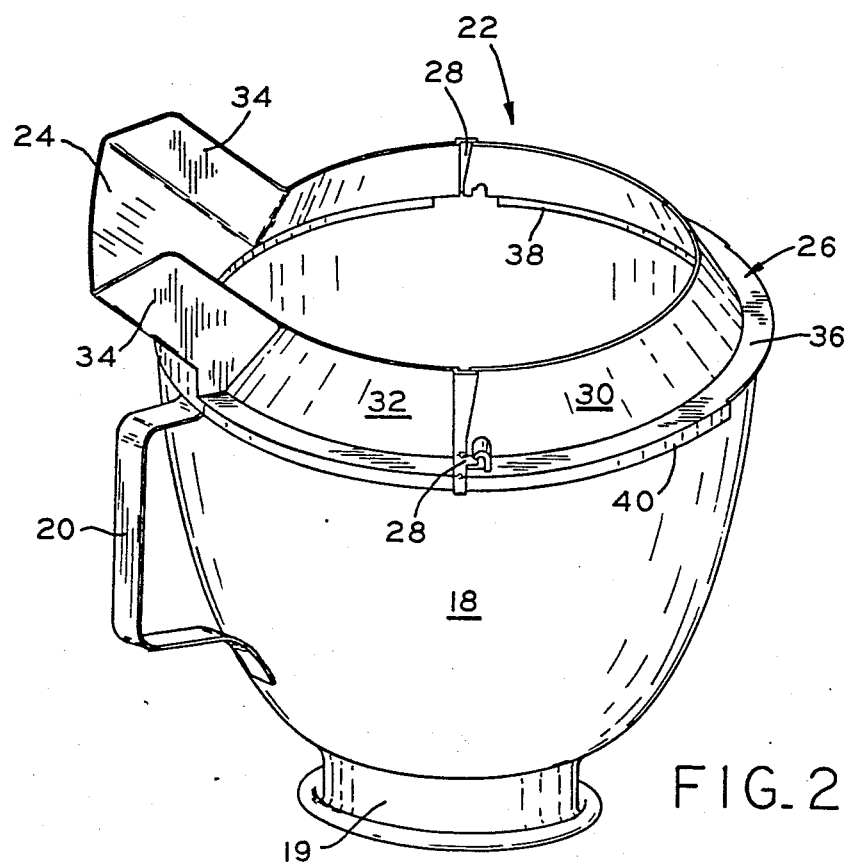
FIG_2

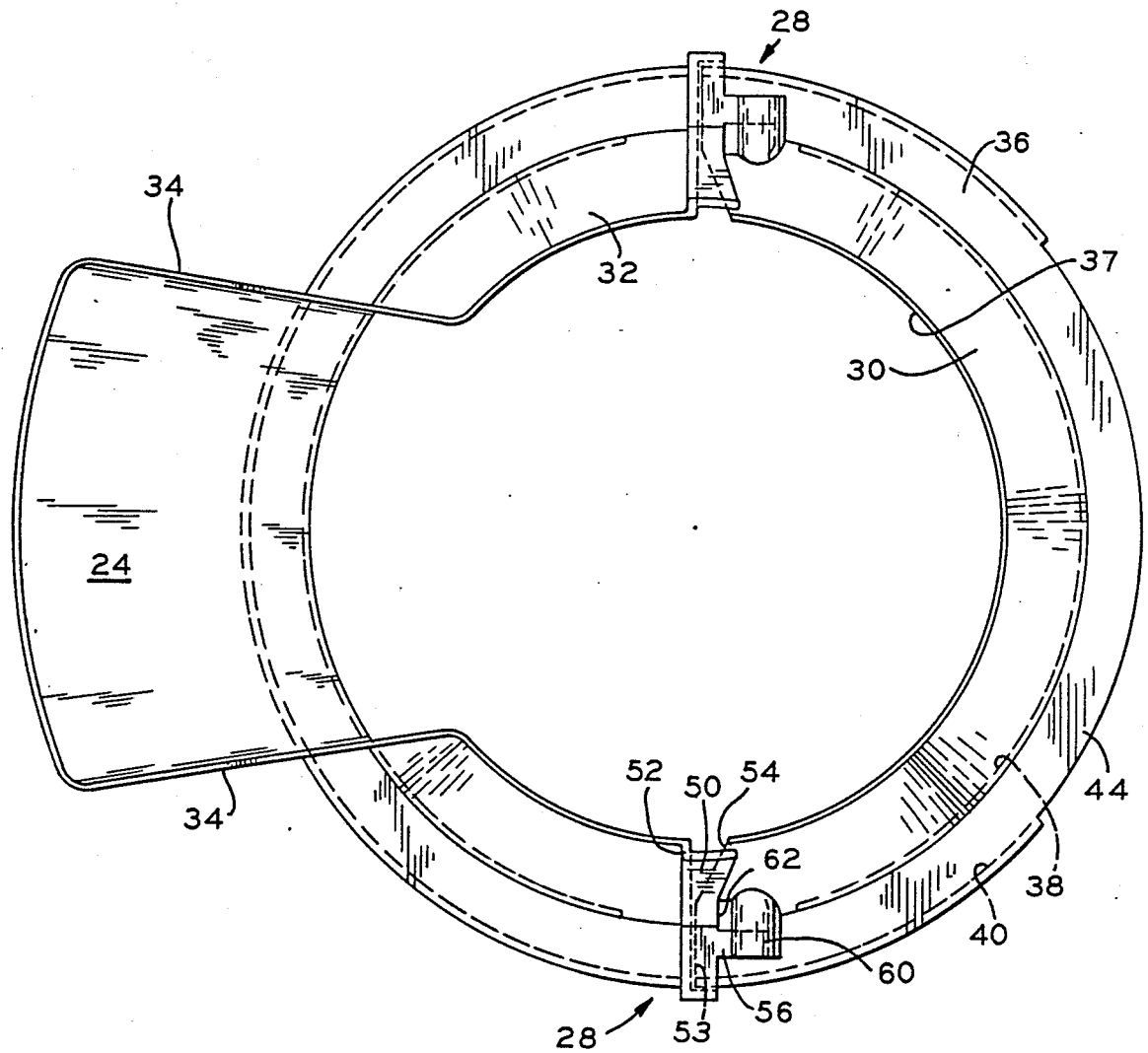
FIG_3
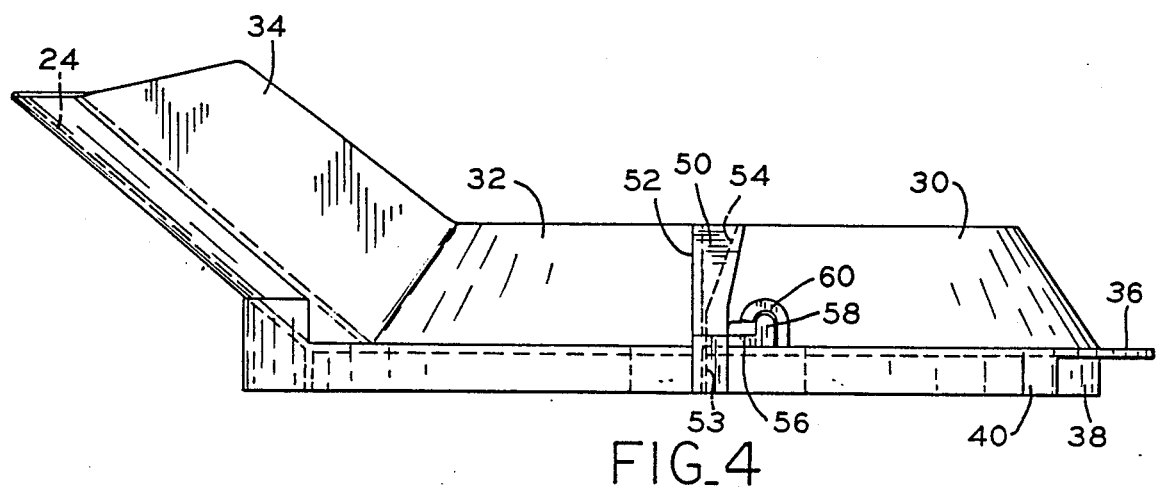
FIG_4

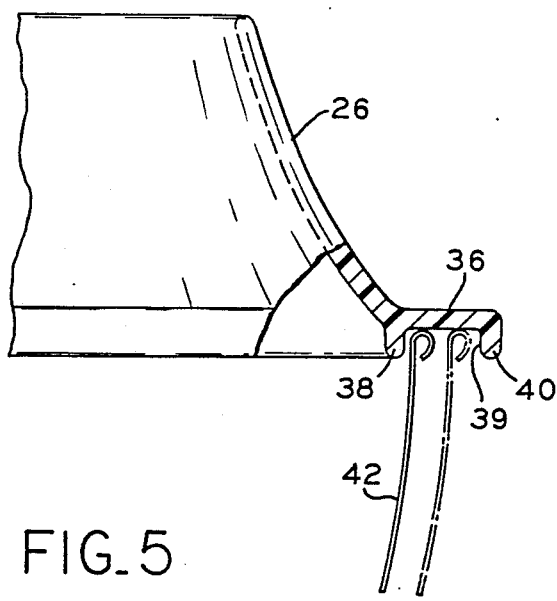
FIG_5
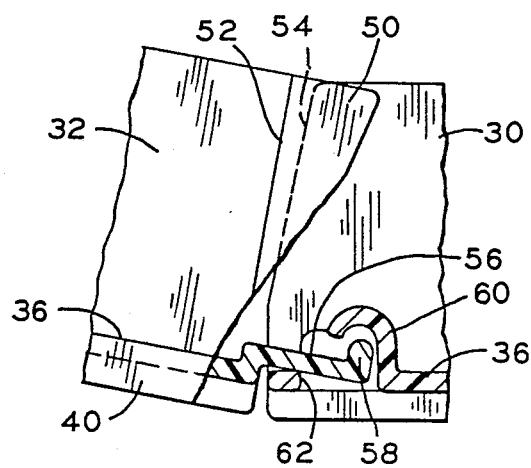
FIG_6
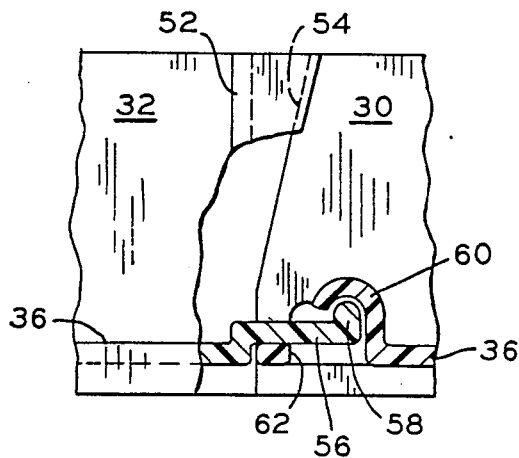
FIG_7
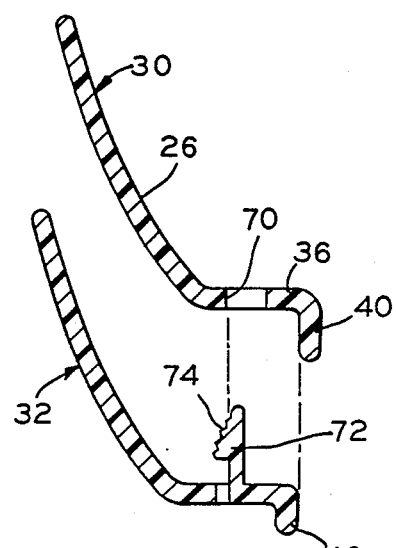
FIG_8

POURING SHIELD FOR A FOOD MIXER

BACKGROUND OF THE INVENTION

This invention pertains to a combination pouring trough and splash shield, also called a pouring shield, for use with a food mixer. In particular, the invention relates to a two-piece pouring shield which is comprised of separable portions for use with a mixing bowl.

In the use of food mixers, it is desirable to use a splash shield mounted on the mixing bowl to prevent splashing of food particles out of the mixing bowl. Furthermore, it is desirable in the use of a food mixer that additional ingredients may be added to the mixing bowl while the mixing bowl is mounted on the mixer. For that reason, it is desirable to provide a pouring shield for use with a food mixing bowl and which is simple in construction, light in weight, economical to manufacture, easy to use, and which fits mixing bowls of various sizes. Furthermore, it is desirable to provide such a pouring shield which is easy to clean and which is transparent so that the mixing operation can be observed through the pouring shield.

Prior art one piece or unitary pouring shields have been provided which are formed of a transparent material and which are frusto-conical in shape and include a pouring trough as an integral part of the pouring shield. Such pouring shields include a sufficiently large central opening to accommodate the planetary action of the agitator shafts of certain mixers. One problem with such one-piece pouring shields has been that they may be used only on bowls of a particular size, so that several sizes of pouring shields had to be provided to accommodate the variously sized bowls used with the mixer. An additional problem with these prior art unitary pouring shields has been that they are not easy to remove from the bowl when the bowl is mounted on a food mixer.

Prior art splash guards for mixing bowls have also been provided which include a removable or pivotable portion. These prior art splash guards were securely attached to the mixing bowl. The removable portion was secured to the splash guard either by removable brackets, pins, or by a bracket which permitted pivoting of the removable portion. Such prior art splash guards did not include a pouring trough and also were not constructed to accommodate variously sized mixing bowls. Furthermore, such prior art splash guards were difficult to clean and difficult to remove from the mixing bowls.

Another type of prior art splash guard comprises a planar splash guard which covers the entire mixing bowl and which includes relatively small apertures for accommodating the agitator shafts of a food mixer. Thus such splash guards can not be used with mixers wherein the agitator shafts move in planetary fashion. Furthermore, such splash guards do not include a pouring trough whereby the entire splash guard must be removed from the mixing bowl in order to add further ingredients thereto.

Thus it is desired to provide a two-piece pouring shield for a mixing bowl which is simple in construction, efficient, light in weight, easy to clean, economical to manufacture, is easy to use with a variety of sizes of mixing bowls, and which may be placed on the mixing bowl when the mixing bowl is mounted on a mixer.

SUMMARY OF THE INVENTION

The present invention, in one form thereof, overcomes the disadvantages of the above described prior art pouring shields by providing an improved pouring shield therefor. The pouring shield of the present invention comprises two separable portions which may be interlocked in position on a mixing bowl. When interlocked, the two portions form a planar ring which is adapted to rest on the edge of the mixing bowl. A splash shield is integrally connected on the upper surface of the planar ring. A pouring trough is also integrally formed with the splash shield. The planar ring further includes a pair of annular concentric ribs which are secured to the lower surface of the ring with a space separating the ribs. This space is wide enough to accommodate the upper edge of variously sized mixing bowls so that the pouring shield may be used on a variety of mixing bowls. The two separable portions of the pouring shield may be separated while the mixing bowl is in position on the food mixer.

The present invention, in one form thereof, comprises a combination pouring trough and splash shield including a generally planar ring which is adapted to rest in the upper edge of a mixing bowl. An upstanding, generally frusto-conical splash shield is mounted on one face of the ring and is integrally formed with a pouring shield. A pair of concentric generally cylindrical ribs are mounted on the other face of the planar ring and are separated by a space for accommodating variously sized mixing bowls. The pouring shield is formed in two separable portions which can be assembled and interlocked to form the pouring shield.

One advantage of the pouring shield according to the present invention is that the pouring shield is formed of separable portions whereby it may be easily mounted on or removed from a mixing bowl.

Another advantage of the pouring shield according to the present invention is that it is easy to clean.

Still another advantage of the pouring shield according to the present invention is that it may be used with variously sized mixing bowls.

Yet another advantage of the pouring shield according to the present invention is that it prevents food from splashing out of the mixing bowl during operation of a food mixer.

A further advantage of the pouring shield according to the present invention is that no fasteners are needed to interlock the pouring shield portions.

Still a further advantage of the pouring shield according to the present invention is that the pouring shield functions both to prevent splashing from the mixing bowl and permits adding of further ingredients to the mixing bowl.

The present invention, in one form thereof, comprises a combination pouring trough and splash shield for use with a mixing bowl. The device includes a generally planar ring having an upstanding splash flange mounted on a first face thereof. The ring and splash flange are formed of a plurality of separable portions which are adapted to be assembled and interlocked. A pouring trough is secured to one of the separable portions.

The present invention, in one form thereof, further comprises a combination pouring trough and splash shield for use with a mixing bowl having a generally planar ring with an upstanding generally frusto-conical splash flange mounted on one face thereof. Two concentric generally cylindrical ribs are mounted on the other face of the ring, and the ribs are separated by a groove. The ring, splash flange and ribs are formed of two separable portions which are adapted to be assembled to interlock in their assembled positions. A pouring trough is secured to one of the separable portions.

The present invention, in one form thereof, comprises a two-piece combination pouring trough and splash shield for use with a food mixer bowl and includes a first section having a first generally planar portions, a first upstanding splash flange portion secured to a first face of said first planar portion and a pouring trough secured to the upstanding splash flange portion. A second section includes a second generally planar portion and a second upstanding splash flange portion secured to a first face of the second planar portion. Means are provided for removably locking the first section to the second section whereby the splash flange portions form a generally frusto-conical splash flange which is separable into first and second splash flange portions substantially along a central dividing plane.

It is an object of the present invention to provide a pouring shield constructed of two separable halves which may be interlocked.

It is another object of the present invention to provide a pouring shield which may be easily mounted on or removed from a mixing bowl while the mixing bowl is mounted on a mixer.

Yet another object of the present invention is to provide a pouring shield which prevents splashing of food from the mixing bowl and whereby further ingredients may be added to the mixing bowl while the mixing bowl is mounted on a mixer.

Still another object of the present invention is to provide a pouring shield which may be used with mixing bowls of various sizes.

Yet still a further object of the present invention is to provide a pouring shield made of two separable portions which may be interlocked without the use of special fasteners.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings wherein:

FIG. 1 is a perspective view of a food mixer including a mixing bowl having the pouring shield of the present invention mounted thereon;

FIG. 2 is an enlarged perspective view of a mixing bowl having the pouring shield according to the present invention mounted thereon;

FIG. 3 is a top plan view of the pouring shield according to the present invention;

FIG. 4 is an elevational view of the pouring shield of FIG. 3;

FIG. 5 is a cross sectional, broken away view of the pouring shield of FIG. 3 mounted on the edge of a bowl;

FIG. 6 is an enlarged, broken away elevational view of the interlocking portions of the pouring shield of FIG. 3 with the portions in position to be separated;

FIG. 7 is an enlarged partially broken away elevational view of the interlocking portions of the pouring shield of FIG. 3 with the portions interlocked;

FIG. 8 is a cross sectional view of an alternative embodiment of the interlocking portions of the pouring shield of FIG. 3.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Referring to FIG. 1, there is shown a food mixer 10 including a stand 12, a motor 14 and an agitator drive 16. A mixing bowl 18 having a base 19 is mounted on the stand. The mixing bowl may include a handle 20. A pouring shield 22 is shown mounted on the bowl, including an integral pouring trough 24 and a splash shield 26. The sides of splash shield 26 may be either straight, convex, or concave in shape. The pouring shield consists of two separable portions 30 and 32 which are held together by locking portions 28. In the disclosed embodiment, sections 30 and 32 each cover substantially one-half (½) of the top edge of the mixing bowl, although other arrangements may also be provided. The advantage of having the pouring shield split along a central plane as shown is that the pouring shield portions 30 and 32 may be slid or lifted off the mixing bowl without removal of the mixing bowl from the mixing stand 12.

Referring now to FIGS. 3-5, it can be seen that the pouring trough 24 consists of two upstanding flanges 34 which permit the user to pour ingredients into the mixing bowl 18 while the mixing bowl is in use. The pouring shield also includes a ring portion 36 having a substantial circular inner aperture 37 to provide sufficient room so that the agitator drive may be planetary in nature. The splash shield 26 is mounted on the upper face of ring 36 while on the lower face of ring 36 two spaced apart ribs 38 and 40 are provided with a space 39 located therebetween. It should also be noted that ribs 38 and 40 are discontinuous. Two sectors are missing from rib 38 in the vicinity of the locking portions 28. One segment of rib 40 is missing near the outer circumference of pouring shield portion 30. It should be understood that ribs 38 and 40 may be provided with more or fewer discontinuities, as described. For instance, a series of protrusions aligned in a circle could replace a continuous rib.

As best seen in FIG. 5, space 39 permits bowls of different sizes to be accommodated by the pouring shield whereby a single pouring shield may accommodate variously sized bowls. The edge 42 of a small bowl is shown in solid lines and the edge of a larger bowl is shown in broken lines.

By referring to FIGS. 3, 4, 6, and 7, it can be seen that portion 32 includes two out-turned flanges 50 which form shoulders 52 with splash shield 26. This arrangement enables the ends of portion 30 to slide between out-turned flanges 50 while the upstanding edges 53 of portion 30 come to rest against shoulders 52. A portion of edge 53 is tapered as shown at 54. Portion 32 also includes a pair of projections 56 which comprise extensions of the horizontal parts of flanges 50. At the end of projections 56 there are provided ball-like protrusions 58. Sockets 60 are formed on portion 30 and furthermore apertures 62 are provided below sockets 60.

The entire pouring shield may be formed of a suitable plastic. Preferably the entire pouring shield is transparent whereby the user may be able to observe the inside of the bowl through the pouring shield. Preferably the entire pouring shield is formed of a suitable plastic material such as for instance polycarbonate.

In operation, as illustrated in FIGS. 6 and 7, to assemble the pouring shield, portion 32 is pivoted through a predetermined arc about the edge of aperture 62, by means of projections 56. This permits protrusions 58 to move downwardly and to be released from sockets 60. Portion 32 can then be moved to the left as shown in FIG. 7 and removed from the bowl. This operation can take place while the bowl is in position on the mixing stand 12. As shown in FIG. 7, when the entire pouring shield, including portions 30 and 32 is at rest on the edge of a bowl, protrusions 58 are captured by sockets 60, whereby portions 30 and 32 are interlocked. Tapered edge 54 permits the tilting movement of portion 32 without interference of edge 53 with shoulder 52.

FIG. 8 discloses another embodiment of locking mechanism 28. In this embodiment, apertures 70 are provided in the ring portion 36 of pouring shield portion 30. Two tabs 72, each including a ribbed face 74, are provided on pouring shield portion 32. By moving portion 30 vertically downwardly onto pouring shield portion 32, tabs 72 will enter respective apertures 70 and lock portions 30 and 32 together. Tabs 74 will engage with the edges of respective slots 70. The two portions 30 and 32 may be disassembled by applying outward force on tabs 72 while lifting portion 30 off pouring shield portion 32.

While this invention has been described as having a preferred design, it will be understood that it is capable of further modification. This application is therefore intended to cover any variations, uses or adaptations of the invention following the general principles thereof and including such departures from the present disclosure as come within known or customary practice in the art to which this invention pertains and fall within the limits of the appended claims.

What is claimed is:

1. A detachable combination pouring trough and splash shield for use with a mixing bowl, comprising:
   a generally planar ring having first and second faces, said ring having an upstanding splash flange mounted on said first face, said ring and splash flange being formed of a plurality of separable portions which are adapted to be assembled and interlocked, said plurality of separable portions comprising a first separable portion having two first ends, and a second separable portion having two second ends, each first end including a projection with a protrusion near an outward edge of said projection, each second end including a socket adapted to receive a said protrusion, one of said separable portions being pivotable on a second said separable portion to release said protrusions from said sockets for separating said separable portions, each said first end including an out-turned flange which forms a shoulder with said associated splash flange, each said second end being configured to permit pivoting movement of said first separable portion through a predetermined arc without engagement of said second ends of said second separable portion with said shoulders; and
   a pouring trough secured to one of said separable portions, whereby said combination pouring trough and splash shield may be placed on a mixing bowl while said mixing bowl is mounted on a mixer.

2. The device as set forth in claim 1 including a pair of concentric annular ribs mounted on the second face of said ring.

3. The device according to claim 1 wherein said splash flange is substantially frusto-conical.

4. The device according to claim 1 wherein said ring and splash flange are split substantially along a central plane thereof to form said separable portions.

5. A detachable combination pouring through and splash shield for use with a mixing bowl, comprising:
   a generally planar ring having a first face and a second face, said ring having an upstanding generally frusto-conical splash flange mounted on said first face and two concentric generally cylindrical ribs mounted on said second face, said ribs separated by a groove, said ring, splash flange, and ribs being formed of two separable portions which are adapted to be assembled and to interlock in their assembled positions, a first separable portion including two first ends comprising projections with a protrusion near an outward edge of each said projection and a second separable portion including two second ends comprising sockets for receiving said respective protrusions, one of said portions being pivoted for releasing said respective protrusions from said respective sockets for separating said two separable portions, each first end including an out-turned flange which forms a shoulder with said one splash flange portion, each second end being configured to permit pivoting movement of a second separable portion through a predetermined arc without engaging said shoulders; and
   a pouring trough secured to one of said separable portions, whereby said combination pouring trough and splash shield may be placed on a mixing bowl while said mixing bowl is mounted on a mixer.

6. The device according to claim 5 wherein said splash shield is split substantially along a central plane thereof to form said separable portions.

7. A detachable two-piece combination pouring trough and splash shield for use with a food mixer bowl comprising:
   a first section having a first and second face, said first section including a first generally planar portion, a first upstanding splash flange portion secured to said first face of said first planar portion, and a pouring trough secured to said first upstanding splash flange portion;
   a second section having a first and second face, said second section including a second generally planar portion, and a second upstanding splash flange portion secured to said first face of said second planar portion;
   said first section having two first ends which include projections thereon with respective protrusions at the respective outward edges of said projections, and each said second section having two second ends which each include a socket for receiving a said protrusion, one of said sections being adapted to pivot for releasing said respective protrusions from said respective sockets for separating said two sections, each said first end including an out-turned flange which forms a shoulder with said first splash flange portion, each said second end being configured to permit pivoting movement of said second section through a predetermined arc without engagement of said second ends with said shoulders; and means for removably locking said first section to said second section whereby said first and second splash flange portions form a unitary splash flange and which is separable into said first and second splash flange portions substantially along a central dividing plane, whereby said combination pouring through and splash shield may be placed on a mixing bowl while said mixing bowl is mounted on a mixer.

8. The device according to claim 7 wherein each said first and second section includes a pair of ribs mounted on said second face of each said first and second generally planar portions, said ribs arranged in concentric circles when said first section is locked to said second section.

9. The device according to claim 7 wherein said splash flange portions in the locked position of said section form a substantially frusto-conical flange.

10. A combination pouring trough and splash shield for use with a mixing bowl, comprising:

a generally planar ring with a first and second face, said ring having an upstanding splash flange mounted on said first face, said ring and splash flange being formed of a first and a second separable portion which are adapted to be assembled and interlocked, said first separable portion having two first ends and said second separable portion having two second ends; and a pouring trough secured to one of said separable portions;

each said first end including a projection with a protrusion at the end thereof and an out-turned flange which forms a shoulder with an associated splash flange;

each said second end including a socket adapted to receive a said protrusion and being configured to permit pivoting movement of said first separable portion through a predetermined arc without engagement of said second ends of said second separable portion with said shoulders;

said first separable portion pivotable on said second separable portion to release said protrusions from said sockets for separating said separable portions whereby said combination pouring trough and splash shield may be placed on a mixing bowl while said mixing bowl is mounted on a mixer.

11. A detachable combination pouring trough and splash shield for use with a mixing bowl, comprising:

a generally planar ring having first and second faces, said ring having an upstanding splash flange mounted on said first face, said ring and splash flange being formed of a plurality of separable portions which are adapted to be assembled and interlocked, said plurality of separable portions comprising a first separable portion having two first ends, and a second separable portion having two second ends, each first end including an upstanding tab on said ring, each second end including a slot on said ring adapted to receive a said tab, one of said separable portions being removable from a second separable portion to release said tabs from said slots for separating said separable portions, a pouring trough secured to one of said separable portions, whereby said combination pouring trough and splash shield may be placed on a mixing bowl while said mixing bowl is mounted on a mixer.

12. The device according to claim 11 wherein each said tabs includes ribs for gripping an edge of a said respective slots.

* * * * *